United States Patent [19]
Rolleri

[11] Patent Number: 4,759,424
[45] Date of Patent: Jul. 26, 1988

[54] ANTI-THEFT DEVICE FOR AUTOMOBILE AND AUTOMOBILE ACCESSORIES

[76] Inventor: Dennis A. Rolleri, 117 Centre St., Nutley, N.J. 07110

[21] Appl. No.: 929,898

[22] Filed: Nov. 13, 1986

[51] Int. Cl.⁴ .................. B60R 25/00; B60R 25/06
[52] U.S. Cl. ...................................... 180/287; 180/90; 70/247
[58] Field of Search ............... 180/287, 90; 70/58, 70/237, 245, 246, 247, 258, 202, 203

[56] References Cited

U.S. PATENT DOCUMENTS

| | | | |
|---|---|---|---|
| 3,452,835 | 7/1969 | Deli et al. | 180/90 |
| 3,710,606 | 1/1973 | Prince | 70/247 |
| 3,822,573 | 7/1974 | Meyers | 70/200 |
| 3,913,701 | 10/1975 | Williams | 180/90 |
| 4,077,276 | 3/1978 | Knox, Jr. | 70/203 |
| 4,116,297 | 9/1978 | Ross et al. | 70/237 |
| 4,131,173 | 12/1978 | Boersma | 70/258 |
| 4,253,537 | 3/1981 | Intveld | 180/90 |
| 4,553,414 | 11/1985 | Caputo et al. | 70/58 |

Primary Examiner—Richard A. Bertsch
Attorney, Agent, or Firm—Janine J. Weins; Michael J. Weins

[57] ABSTRACT

The present invention is directed to an anti-theft device and in particular, to a device which covers so as to obscure and secure all or part of the console of an automobile near the gear shift lever and all or part of an automobile radio, tape deck, CB radio or scanner, when such are mounted in the console or central area of the dashboard. The device of the present invention has a contoured shield. The sides of the shield are provided with rails contoured to engage the console and extend around the console. A protrusion is positioned in the shield and so configured as to accept the gear shift lever when the shield is positioned over the console. A means for locking the shield around the gear shift lever is provided. It is preferred that means be provided to positively attaches the shield to the dashboard.

10 Claims, 5 Drawing Sheets

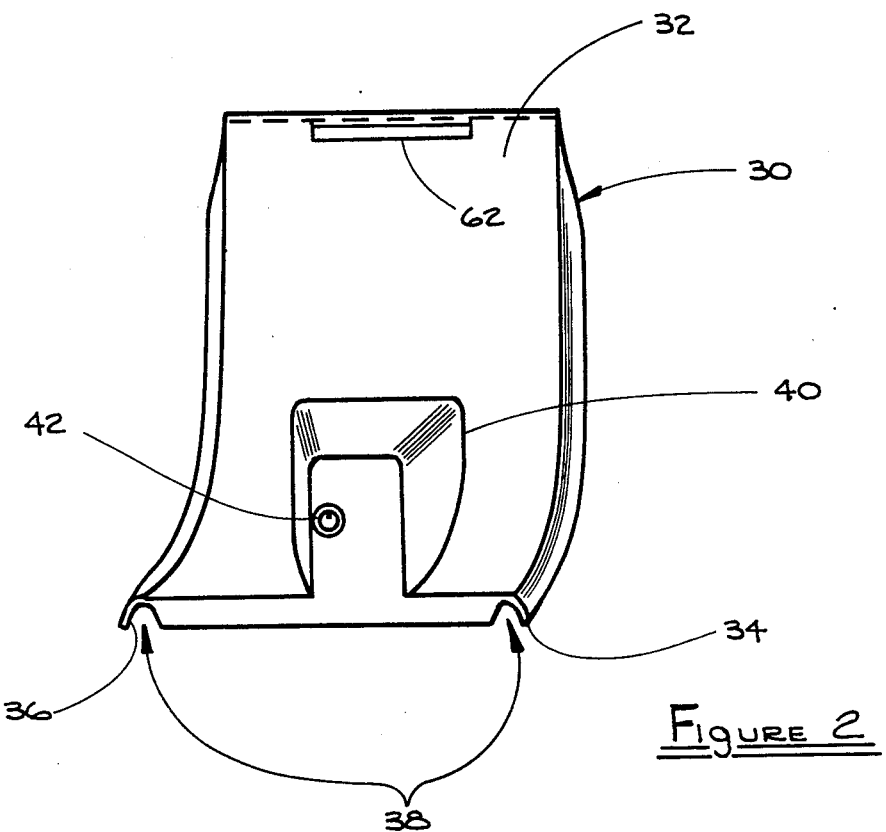
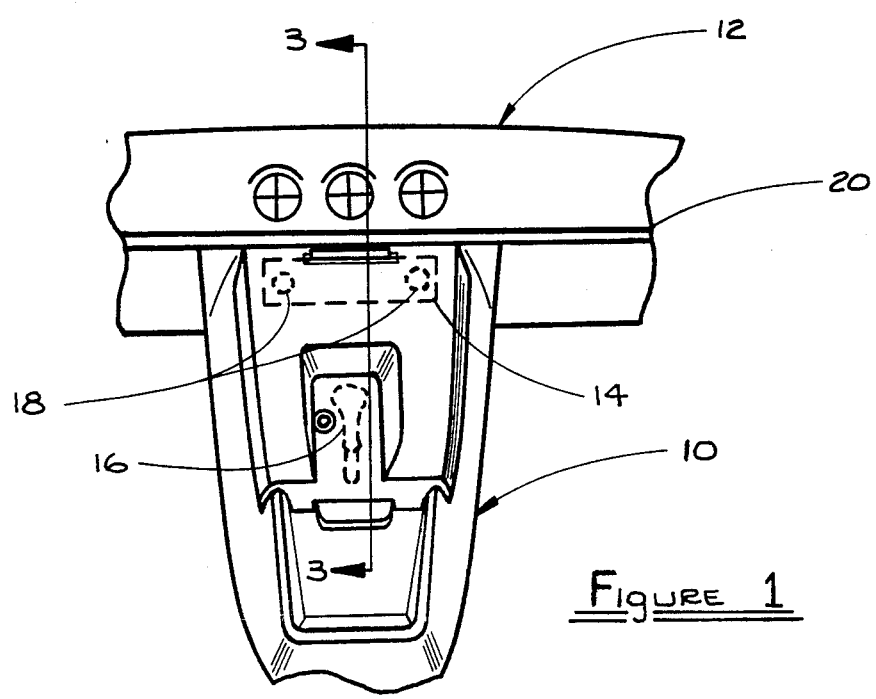

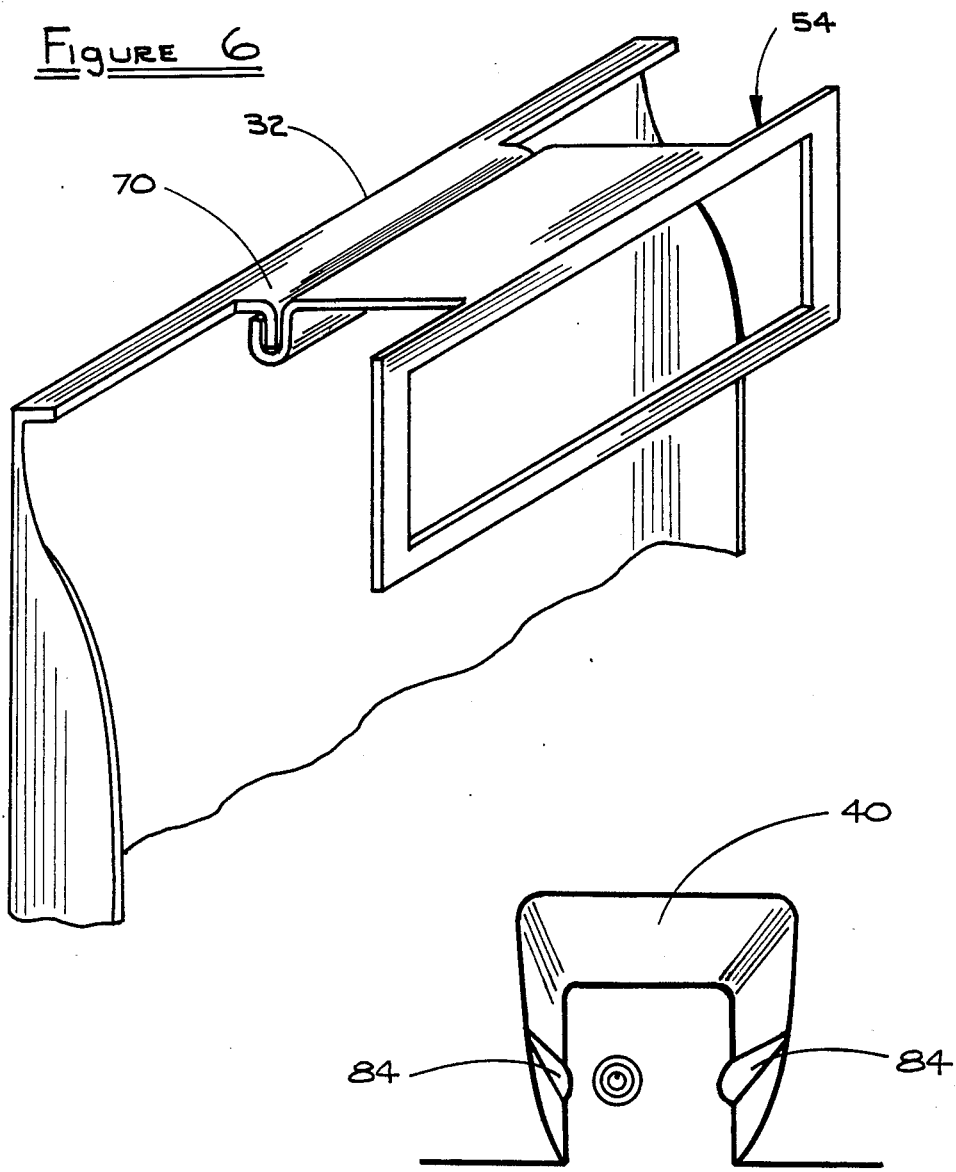

ANTI-THEFT DEVICE FOR AUTOMOBILE AND AUTOMOBILE ACCESSORIES

FIELD OF INVENTION

The present invention relates to a device for deterring theft of an automobile and its accessories by confining and thereby limiting access to the gear shift lever, console and dashboard mounted accessories, such as a radio.

BACKGROUND ART

Automobiles and their accessories, such as radios, are frequently stolen. The frequency of theft is highest in areas of dense population and for luxury automobiles and/or expensive accessories. Since access can be easily obtained in soft top convertibles by cutting the convertible top, radios and other accessories are more likely to be stolen from soft top convertibles.

Several patents teach devices to deter the theft of automobiles and/or their accessories. One such device is taught by U.S. Pat. No. 3,625,031 entitled: APPARATUS FOR PREVENTING THEFT OF PORTABLE ARTICLES. The '031 patent teaches attaching removable portable articles to the vehicle's steering column by means of a flexible lockable cable. The cable is provided with an adjustable loop at one end which can encircle the steering column, the other end of the cable locks to a bracket which is affixed to the portable article.

Another type of anti-theft devise is taught in U.S. Pat. No. 3,595,041 entitled: LOCKING ARRANGEMENT. The device of the '041 patent is in particular designed to prevent theft of communication equipment from a vehicle. The locking device attaches to the mounting bracket to which the communication equipment is affixed. A portion of the locking device circumscribes the communication equipment and is locked by use of a padlock or other similar means.

U.S. Pat. No. 3,822,049 entitled: ANTI-THEFT BRACKET DEVICE, teaches a bracket assembly, which limits access to and the removal of, equipment mounted on the bracket. The bracket assembly can be used to mount a tape recorder, a radio, speakers or similar equipment to the transmission hump or the fire wall of a vehicle. The bracket has two members. The first member is permanently affixed to the vehicle, the second member is permanently affixed to the accessory. The members can be engaged and locked in such a manner as to prevent their separation.

U.S. Pat. No. 4,248,069 entitled: APPARATUS FOR PROTECTING AND PREVENTING THEFT ON IN-DASHBOARD MOUNTED RADIOS AND THE LIKE, teaches a metal cover which can be locked over the radio, limiting access to the radio and to obscure the radio from view.

U.S. Pat. No. 4,028,913 entitled: CB RADIO LOCKING DEVICE, teaches a bracket type of device which can be adjusted to fit around a CB radio. The C-Shaped bracket is permanently affixed to the vehicle and provided with a front lockable latching means, which when unlocked allows the CB radio to be slipped from the bracket and removed from the vehicle.

U.S. Pat. No. 4,131,173 entitled: INSTRUMENT PANEL COVER FOR VANDALISM PROTECTION, teaches a cover which can be placed over the instruments on a vehicle, such as an open cab of a construction vehicle, and locked by means of a conventional padlock so as to limit access to the vehicle dashboard and instrument panel. The panel when not in use can be removed and folded for storage.

An anti-theft device, which as a unit limits access to both an automobile transmission and automobile accessories and provides notice of the limited access to a potential thief, is not available. Expensive soft-top automobiles, because they are easily accessed, are particularly prone to theft. For example, Mercedes Benz automobiles are very expensive imported cars which frequently have radios that cost several thousand dollars. These radios have a high value on the illegal market. If the Mercedes Benz is a soft top convertible and an expensive radio is in view, the top is likely to be damaged so that a thief may gain quick, easy access to the radio.

There is a need for a device to mitigate theft by visually and physically limiting access to the transmission and console mounted accessories such as a radio, tape deck, CB radio or scanner; and further to place a potential thief on notice that access is limited.

I, being the owner of a soft top expensive automobile in which I had installed an expensive sound system for my own pleasure and having had my soft top convertible slashed and my sound system stolen, have developed this device to deter future theft.

SUMMARY OF THE INVENTION

It is an object of the invention to provide an anti-theft device which protects an automobile by securing in position and limiting access to the gear shift lever.

It is an object of the invention to provide an anti-theft device which protects dashboard and console mounted accessories in an automobile by obscuring and limiting access.

It is a further object of the invention to provide an anti-theft device which will lock the gear shift lever of an automobile and thus make it difficult to move the automobile, and further which provides notice that the gear shift lever is protected and secured.

It is yet another object of the invention to provide visual evidence of the presence of a theft deterrent device so as to reduce the likelihood of forced entry into an automobile.

It is a further object of the invention to provide a visual theft deterrent which will discourage thieves from cutting a soft convertible top or breaking the windows of an automobile to gain access to the interior of the automobile.

These and other objects of the invention will become appreciated from the following description, examples, and figures.

The present invention is directed to an anti-theft device, and in particular, to a device which covers so as to obscure and secure all or part of the console of an automobile near the gear shift lever, and all or part of an automobile radio, tape deck, CB radio and/or scanner when such are installed in the console or central portion of the dashboard.

The device of the present invention has a contoured shield. The sides of the shield are provided with rails which are so contoured as to engage the console and extend around the console. A protrusion is provided to the shield. The protrusion is so configured as to accept the gear shift lever when the shield is positioned over the console. A means is provided for locking the shield to the gear shift lever.

The present device is preferably designed to obscure from view and secure the transmission shift lever and automobile accessories mounted in the dashboard and console.

BRIEF DESCRIPTION OF THE FIGURES

FIG. 1 is a schematic representation of an anti-theft device in accordance with the present invention positioned over a portion of the dashboard, a radio and transmission console of a Mercedes Benz.

FIG. 2 is a schematic representation of an anti-theft device in accordance with the present invention which can be used to cover a portion of the dashboard, the radio and the transmission console shown in FIG. 1.

FIG. 3 shows details of the protrusion which is provided to the shield to accommodate the gear shift lever and details of the locking means.

FIG. 6 is a schematic representation of a second embodiment of a catch mechanism which can be used to securing the anti-theft device to the dashboard.

FIG. 8 is a schematic representation of a preferred configuration for the protrusion. The preferred configuration is provided with hand grips to aid in positioning and removing the shield.

BEST MODE FOR CARRYING THE INVENTION INTO PRACTICE

Figure 3:
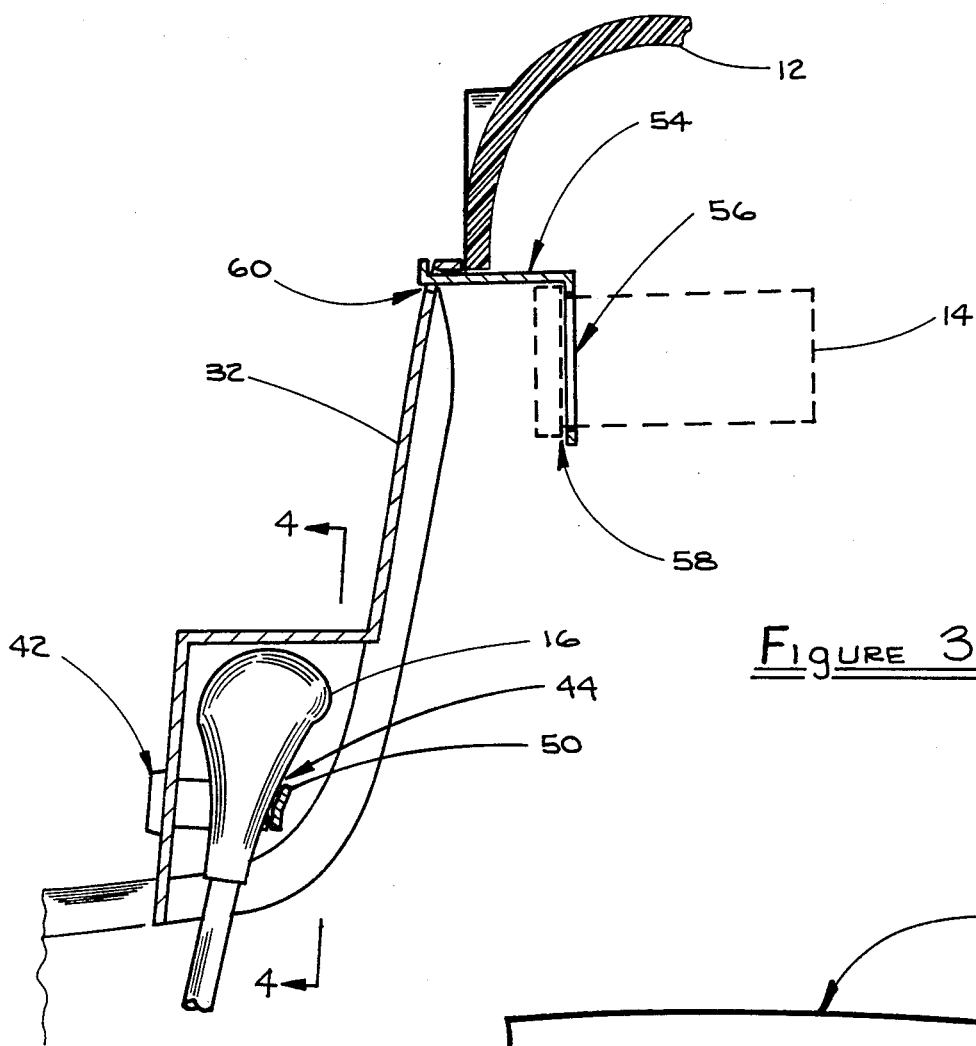
FIG. 3 is a cross-section of FIG. 1 along the line 3—3.

The present invention is directed to an anti-theft device which protects, obscures and secures the gear shift lever and console mounted accessories, such as a radio.

FIG. 1 is a schematic representation of an anti-theft device in accordance with the present invention positioned over the console 10 and dashboard 12 of a Mercedes Benz. A radio 14 is located in the center of the console 10, and in front of and above the transmission shift lever 16. The radio 14 has extending from it controls 18 such as knobs or push buttons. The controls 18 reside behind a vertical plane tangent to a ridge 20 on the dashboard 12.

FIG. 2 is a schematic representation of one embodiment of the anti-theft device 30 of the present invention. The anti-theft device 30 covers and thereby obscures and secures both the console mounted radio 14 and the gear shift lever 16 shown in FIG. 1.

The anti-theft device 30 is clearly visible to one looking into the interior of the automobile through a window. Because the anti-theft device 30 can be clearly viewed it serves as a deterrent to those who might wish to break into the automobile for the purpose of removing the radio 14 and/or stealing the vehicle. In particular, the anti-theft device 30 is sufficiently prominent as to discourage forced entry by an individual who, before noticing the anti-theft device, might have considered breaking a window or slashing the soft top roof if the automobile were a convertible.

The anti-theft device 30 has a shield 32 which has a curved cross-section and is contoured so as to engage the console 10. Two spaced-apart rails 34 and 36 are provided to the shield 32. The rails 34 and 36, as shown in FIG. 2, are contoured at the upper portion of the device as to match the curvature of the dashboard 12. At the lower portion the rails 34 and 36 are so positioned and contoured as to form channels 38 which engage the console 10. A protrusion 40 is provided to the shield 32 and so configured as to accept the gear shift lever 16. A locking means 42 is provided to protrusion 40. The locking means 42 locks the shield 32 around the gear shift lever 16 and in so doing holds the shield 32 in contact with the console 10 and restricts movement of the gear shift lever 16.

Figure 4:
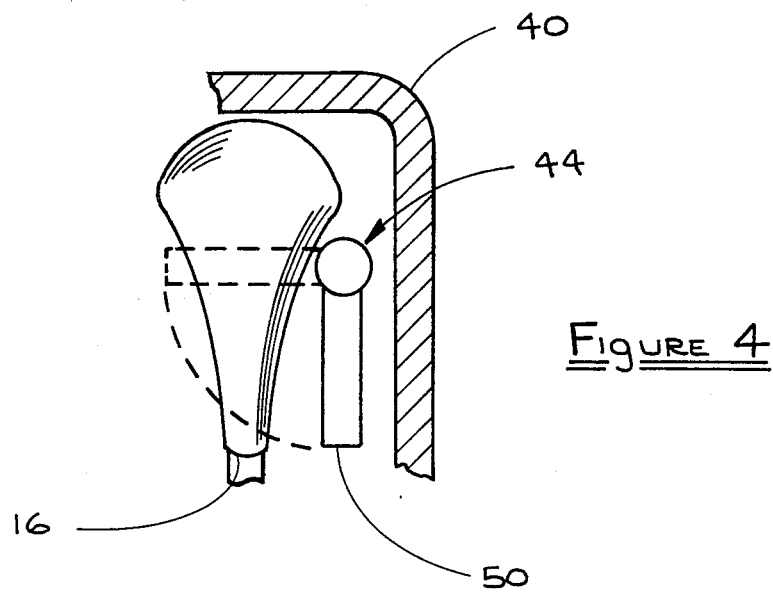
FIG. 4 is a cross-section of FIG. 3 along the line 4—4 and shows details of how a locking mechanism, in accordance with the present invention, engages the gear shift lever.

A locking means 42 in the protrusion 40 has preferably a latch-type mechanism 44 as illustrated in FIGS. 3 and 4. A key lock can be used to activate the latch type mechanism by raising an arm 50 to a position which embraces and securely engages the gear shift lever 16. Alternatively, a combination lock can be used to position the arm 50.

Figure 5:
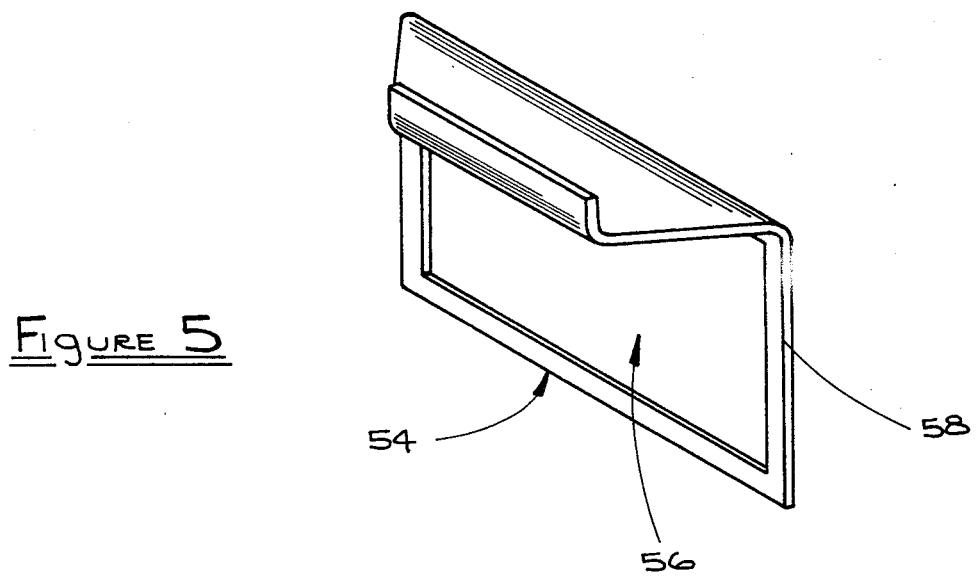
FIG. 5 is a schematic representation of a catch mechanism which can be affixed to the dashboard for the purpose of securing the anti-theft device to the dashboard.

FIG. 5 shows a clip 54 which can be positioned between the radio 14 and the dashboard 12 and affixed to the dashboard 12. The clip 54 has an opening 56 through which the radio 14 passes. A rim 58, on the upper edge of the clip 54, is positioned between the dashboard 12 and the radio 14 as illustrated in FIG. 3. The clip 54 engages a receptor 60 which is provided to the shield 32 to assure positive and secure attachment of the anti-theft device 30 to the dashboard 12 and to reduce the possibility of insertion of a pry-bar between the dashboard 12 and the anti-theft device 30.

In one embodiment the receptor 60 is a slot 62 such as shown in FIGS. 1, 2 and 3 into which the clip 54 can be inserted. Alternatively, the receptor 60 may be a fold-over bracket 70 which is provided to the shield 32 as shown in FIG. 6. The bracket 70 engages the the clip 54 and thus assure secure attachment of the shield 32 to the dashboard 12.

Figure 7:
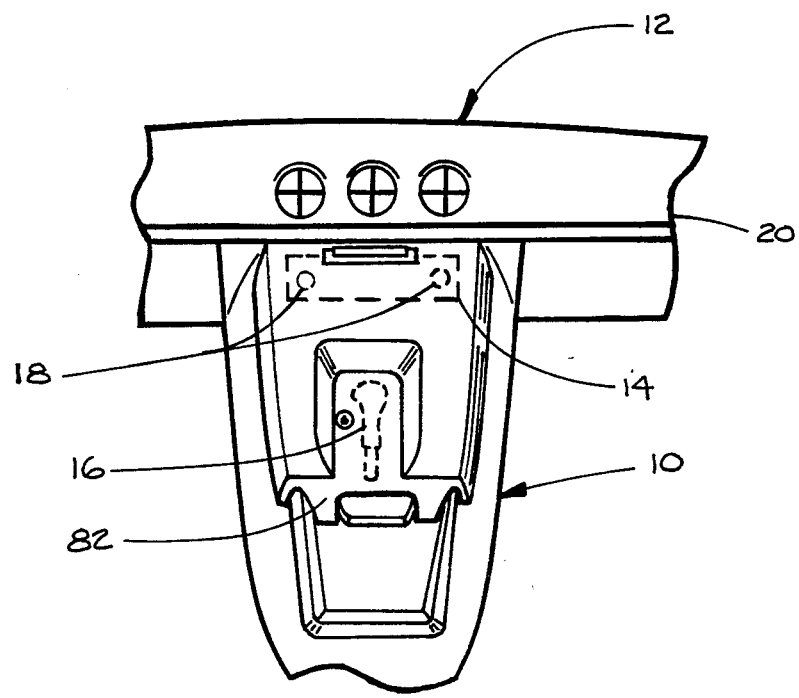
FIG. 7 is a schematic representation of a base closure plate which can be attached to the anti-theft device for the purpose of further securing the anti-theft device to the console.

Preferably a base closure plate 82 is provided to the shield 32 as shown in FIG. 7 to further limit the likelihood of a pry bar being inserted between the console 10 and the shield 32. The base closure plate 82 should be contoured to engage the surface of the console 10.

Attachment of the shield 32 to the gear shift lever 16, and the attachment of the shield 32 to the dashboard 12 via the clip 54 assures positive attachment of the anti-theft device 30 to structural elements of the dashboard 12 and the console 10. Such attachment is important since the console may lack structural integrity.

FIG. 8 shows a preferred embodiment of the anti-theft device 30 in which the protrusion 40 is provided with indentations 84, which can be used to assist in the positioning the shield 32. The indentations 84 allows one to grip the anti-theft device 30 with the hand.

While the novel features of the invention have been described in terms of preferred embodiments and particular applications, it should be appreciated by one skilled in the art that any deviation in form and substance from the device of the present invention can be made by one skilled in the art without departing from the spirit of the invention.

What I claim is:

1. A device to deter theft of an automobile and automobile accessories comprising:

a shield contoured to cover a console mounted gear shift lever and a portion of the automobile dashboard;

a protrusion in said shield, said protrusion being so configured as to accept and obscure said gear shift lever;

means of locking said shield to said gear shift lever; and two spaced apart rails attached to said shield, said spaced apart rails being so positioned as to overlap said console when the shield is positioned over said console.

2. The anti-theft device of claim 1 further comprising: a means for attaching said shield to said dashboard.

3. The anti-theft device of claim 2 wherein:

the accessories include a radio and said means for attaching said shield to said dashboard further comprises is a clip attached to said radio; and a slot which is provided to said shield; said clip and said slot being so positioned as to engage when said shield is positioned over said console.

4. The device of claim 3 further comprising:

a base closure plate attached to said shield and contoured to mate with said console.

5. The device of claim 3 wherein said means for locking said shield to said gear shift lever further comprises a lock mechanism mounted in said protrusion and an arm attached to a bar which upon locking engages said gear shift lever.

6. The device of claim 5 wherein said protrusion is provided with an indentation to aid in gripping and positioning said anti-theft device.

7. The device of claim 2 wherein the accessories include a radio and said means for attaching said shield to said dashboard further comprises:

a clip attached to said radio; and a fold-over bracket attached to said shield, said fold-over bracket engaging said clip when said shield engages said console.

8. The device of claim 7 further comprising:

a base closure plate attached to said shield and contoured to mate with said console.

9. The device of claim 7 wherein said means for locking said shield to said gear shift lever further comprises a lock mechanism mounted in said protrusion and an arm attached to a bar which upon locking engages said gear shift lever.

10. The device of claim 9 wherein said protrusion is provided with an indentation to aid in gripping and positioning said anti-theft device.

* * * * *